United States Patent
Vollkommer et al.

(10) Patent No.: US 6,390,637 B1
(45) Date of Patent: May 21, 2002

(54) FLAT LIGHTING DEVICE AND METHOD FOR OPERATING

(75) Inventors: Frank Vollkommer, Buchendorf; Lothar Hitzschke, Munich, both of (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/622,476

(22) PCT Filed: Nov. 11, 1999

(86) PCT No.: PCT/DE99/03591

§ 371 Date: Aug. 17, 2000

§ 102(e) Date: Aug. 17, 2000

(87) PCT Pub. No.: WO00/38482

PCT Pub. Date: Jun. 29, 2000

(30) Foreign Application Priority Data

Dec. 21, 1998 (DE) .......................................... 198 58 810

(51) Int. Cl.[7] .................................................. F21V 8/00
(52) U.S. Cl. ............................................ 362/27; 362/31
(58) Field of Search ............................... 362/27, 31, 26; 349/68

(56) References Cited

U.S. PATENT DOCUMENTS 5,039,207 A * 8/1991 Green ........................ 349/68 X
5,311,104 A    5/1994 Antle
5,408,388 A    4/1995 Kobayashi et al.
5,420,481 A    5/1995 McCanney
5,537,296 A    7/1996 Kimura et al.
5,649,754 A    7/1997 Matsumoto
6,181,391 B1 *  1/2001 Okita et al. ................ 362/31 X

FOREIGN PATENT DOCUMENTS

| EP | 0798507 | 10/1997 |
| EP | 0781078 | 1/1998 |
| EP | 0969311 | 1/2000 |
| WO | 9423442 | 10/1994 |
| WO | 9512964 | 5/1995 |

* cited by examiner

*Primary Examiner*—Stephen Husar
(74) *Attorney, Agent, or Firm*—Carlo S. Bessone

(57) ABSTRACT

A flat lighting device (1) has an optical conductor plate (2) and at least two electric light sources (3, 4) which are suitable for coupling light into an optical conductor plate (2) during operation. A first light source (3) is arranged adjacent to the optical conductor plate (2), and a second light source (4) is arranged downstream of the first light source (3) with reference to the optical conductor plate (2) in such a way that at least a portion of the light emitted by the second light source (4) during operation can pass through the first light source (3) into the optical conductor plate (2). In dimmed operation, the first light source (3), which is closest to the optical conductor plate (2), is switched off and reduces the light flux to be coupled into the optical conductor plate (2) from the second light source (4). Extreme dimming is also possible in this way without there being a change in the electric and/or lighting properties of the light source.

8 Claims, 3 Drawing Sheets

FLAT LIGHTING DEVICE AND METHOD FOR OPERATING

TECHNICAL FIELD

The invention relates to a flat lighting device in accordance with the preamble of Claim 1. The invention also relates to a method for operating this lighting device.

More precisely, this is a flat lighting device in the case of which the light of at least one light source is coupled into an optical conductor plate, for example through at least one narrow side ("edge") of the optical conductor plate (so-called "edge-light technique"). By means of reflection, for example at suitable structures on the underside of the optical conductor plate, this light passes through to the outside over the entire front side of the optical conductor plate, and therefore acts as a flat light source which is extended in accordance with the dimensions of the optical conductor plate.

Such lighting devices serve the purpose, for example, of backlighting displays, in particular liquid crystal displays (LCDs), but also large-area advertising panels. Liquid crystal displays have multifarious uses, for example, in control rooms, aircraft cockpits and, increasingly, also motor vehicles, in consumer electronics and as display screens for personal computers (PCs).

PRIOR ART

Such a lighting device is already known from U.S. Pat. No. 5,408,388. A tubular fluorescent lamp is arrange( parallel to the corresponding closest narrow side on two narrow sides, situated opposite one another, of the optical conductor plate. In order to increase the luminance, and to improve the uniformity, reflecting structures are arranged on the rear side of the optical conductor plate, and diffusely scattering structures are arranged on the front side of the optical conductor plate.

In some cases, for example in darkened rooms and in motor vehicles, aircraft or the like at night, it is necessary for the luminance of the display, and consequently the lighting device, to be lowered, that is to say to be "dimmed".

It is a disadvantage in the prior art that a possibly necessary steep lowering of the luminance cannot be implemented only with the aid of a corresponding lowering of the electric power coupled into the light sources, since in this case either the colour temperature of the light changes too severely, or else the discharge becomes inhomogeneous and the operation of the light source becomes unstable, or the light source even abruptly goes out completely.

SUMMARY OF THE INVENTION

It is the object of the present invention to provide a flat lighting device which avoids the disadvantages mentioned and permits the possibility of improved dimming.

According to the invention, a first light source is arranged adjacent to the optical conductor plate of the flat lighting device, and a second light source is arranged downstream of the first light source with reference to the optical conductor plate.

The formulation " . . . arranged downstream of the first light source with reference to the optical conductor plate" in no way means that the light sources and the optical conductor plate would necessarily have to be arranged in a common plane. Rather, the lamps can also be offset relative to one another and to the optical conductor plate. What is decisive for the advantageous action of the invention is merely that at least a portion of the light emitted by the second light source passes through the first light source into the optical conductor plate. If appropriate, it is also necessary, or at least helpful to have an additional optical system, known per se, which guides the light appropriately through the individual components of the lighting device. The term "downstream of"—or, from the inverted point of view, the complement "upstream of"—is therefore to be related in this context to the path which the light beams of the second light source cover through the first light source into the optical conductor plate.

For the extreme dimming operation, it is provided to switch off the first light source, and to leave only the second light source switched on or, as the case may be, to switch it on for the first time. For the light of the second light source, which is being coupled into the optical conductor plate, for example through one of its narrow sides, the first light source acts as a diffuser and/or absorber, and thus reduces the fraction of the light flux actually coupled in and, consequently, the luminance of the optical conductor plate.

Suitable in principle as light sources are all elongated electric lamps, in particular elongated fluorescent lamps, for example two tubular fluorescent lamps, which are oriented parallel to one another, or else a single fluorescent lamp having two luminous parts which can be operated independently of one another, for example the two limbs of a U-shaped fluorescent lamp with electrodes which can be switched independently for each limb.

The separate switchability can be implemented with particular ease using dielectrically impeded electrodes, in particular electrodes arranged outside the discharge vessel of the fluorescent lamp.

This type of lamp normally contains in its discharge vessel an inert gas, for example, xenon, as discharge medium. The dielectrically impeded discharge produces excimers, for example, $Xe_2^*$, which generate electromagnetic radiation, in particular UV/VUV radiation, which is transformed into visible light by means of fluorescent material(s), if appropriate. Reference is made to the exemplary embodiments for further details on this.

The first light source is preferably provided with a first aperture which, in the simplest case, that is to say without the use of additional optical elements, faces the optical conductor plate. The light is emitted specifically in the direction of the optical conductor plate with the aid of the aperture and, if appropriate, further optical elements. It is possible in this way to achieve an improved efficiency in normal operation.

In the case of the use of a fluorescent lamp, the aperture can be implemented in the simplest case by virtue of the fact that, in part, either the fluorescent material is completely cut out there, or at least thinner layer is applied than in the remaining part of the wall of the lamp.

The measure of the lowering of the luminance by the action of scattering and/or absorption action of the first light source can be influenced by the width of a second aperture, which is arranged along the first light source and faces the second light source. Specifically, the light from the second light source then preferably passes through this second aperture into the first light source and, from there, further on to the optical conductor plate. The second aperture thus acts, as it were, as a slotted stop for the light being coupled into the first light source from the second light source. With the aid of a correspondingly narrow aperture in the first light source, it is thus possible also to use a second light source, which is operated in conjunction with complete electric power injection, to achieve an in principle arbitrarily small luminance of the optical conductor plate.

The second aperture is typically narrower than the first aperture. As a result, a strong scattering, that is to say evident dimming, is achieved on the one hand, and a high efficiency of the first lamp in the undimmed state is achieved, on the other hand.

Moreover, the wall of the lamp can also have a layer for reflecting visible light, the aforementioned apertures being cut out from this reflective layer, or else being at least sufficiently thin in these regions.

The following method steps are proposed according to the invention for the operation, including the dimming operation of the flat lighting device.

For the operation with a high luminance of the optical conductor plate, denoted below as "normal operation", at least the first light source is switched on, the second light source optionally being switched on in addition. In this operating state, a certain dimming can already be achieved by reducing the power injection into the first light source in a way known per se, this type of dimming, as already mentioned in the beginning, being set certain limits, so that it is not intended for it to be further regarded as a problem here.

For the operation with a luminance of the optical conductor plate which is lower, or even substantially lower, than this, denoted below as "dimmed operation", the first light source is switched off, while the second light source remains switched on or, if appropriate, is switched on for the first time.

Of course, the method according to the invention also provides the possibility of starting directly in dimmed operation, that is to say of immediately switching on the second lamp starting from a state in which both lamps are switched off. In each case, the light flux, being coupled into the optical conductor plate, of the second light source is reduced by the first, switched-off light source, or by scattering and/or absorption. The reduction or scattering action of the first light source, and thus the fraction of light actually coupled in and, finally, the luminance of the optical conductor plate can, as already explained further above, be influenced by the concrete configuration of the first light source, in particular by means of the second aperture.

In a particularly simple design, the second light source is a conventional tubular fluorescent lamp without an aperture. The first light source is preferably an aperture fluorescent lamp.

In addition, it can be advantageous to cover the luminance region between the two states of "first light source on" and "first light source off" with the aid of a variable active power injection—in accordance with the teaching of WO-A-94/23442-, at least into the first lamp. By specific selection of the parameters of "pulse width" and "pulse duration" for the pulsed active power injection described in WO-A-94/23442, the light flux both of the first and of the second light source can be influenced.

It is advantageous in this regard that possible inhomogeneities in the luminance distribution of the second light source, such as can occur with the lowering of the electric power injection, play no role, since these are largely homogenized by the scattering action of the first light source.

DESCRIPTION OF THE DRAWINGS

The invention is to be explained in more detail below with the aid of exemplary embodiments. In the drawing:

FIGS. 1a, 1b show a diagrammatic top view and, respectively, sectional illustration along the line II of a flat lighting device 1 according to the invention for backlighting liquid crystal displays (not illustrated), comprising an optical conductor plate 2, a double-aperture fluorescent lamp 3, a second fluorescent lamp 4 and two electronic ballasts 5, 6 (referred to respectively below as "EB" for short) for operating the two lamps 3, 4.

Figure 1A:
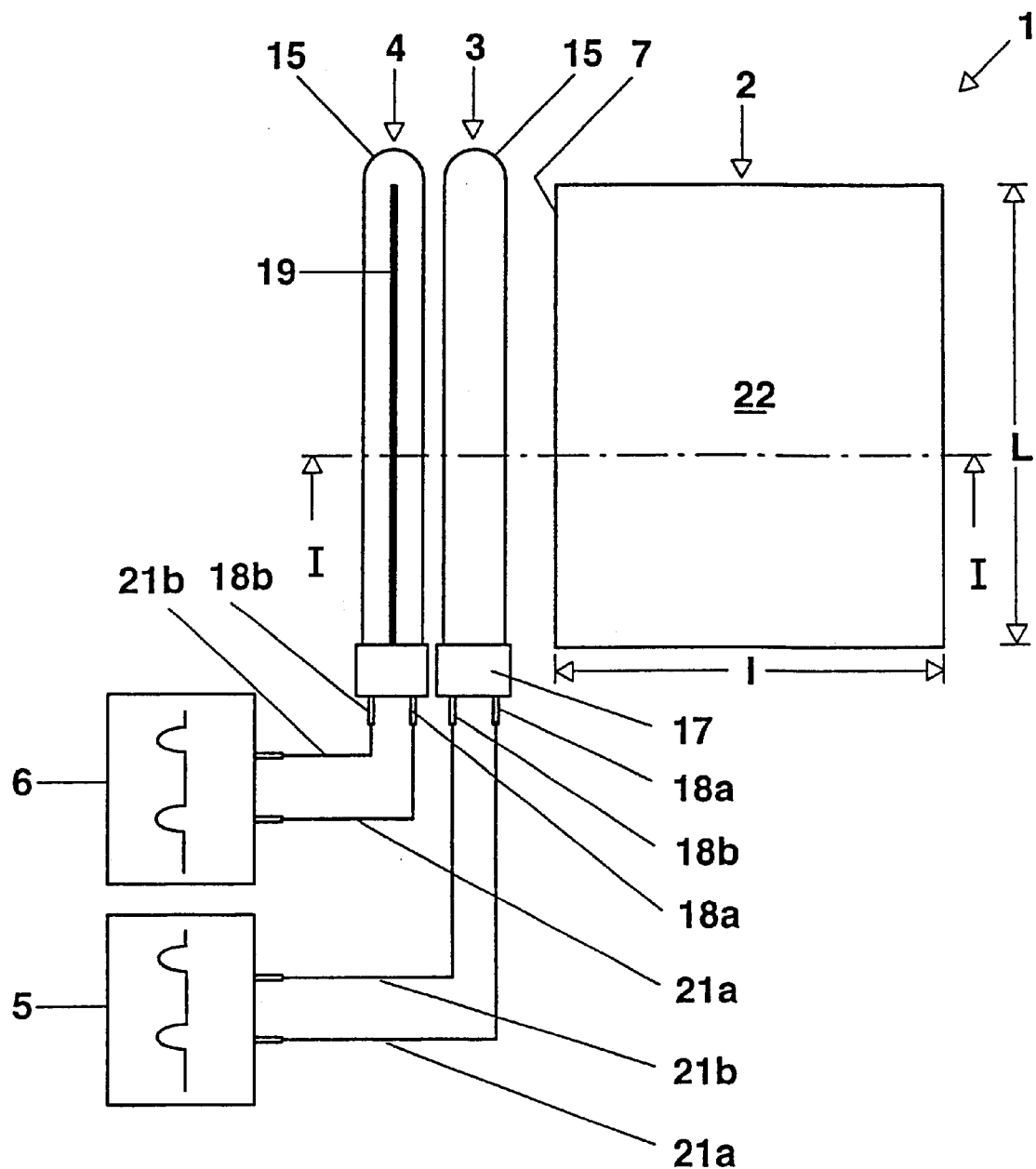
FIG. 1a shows a flat lighting device.
Figure 1B:
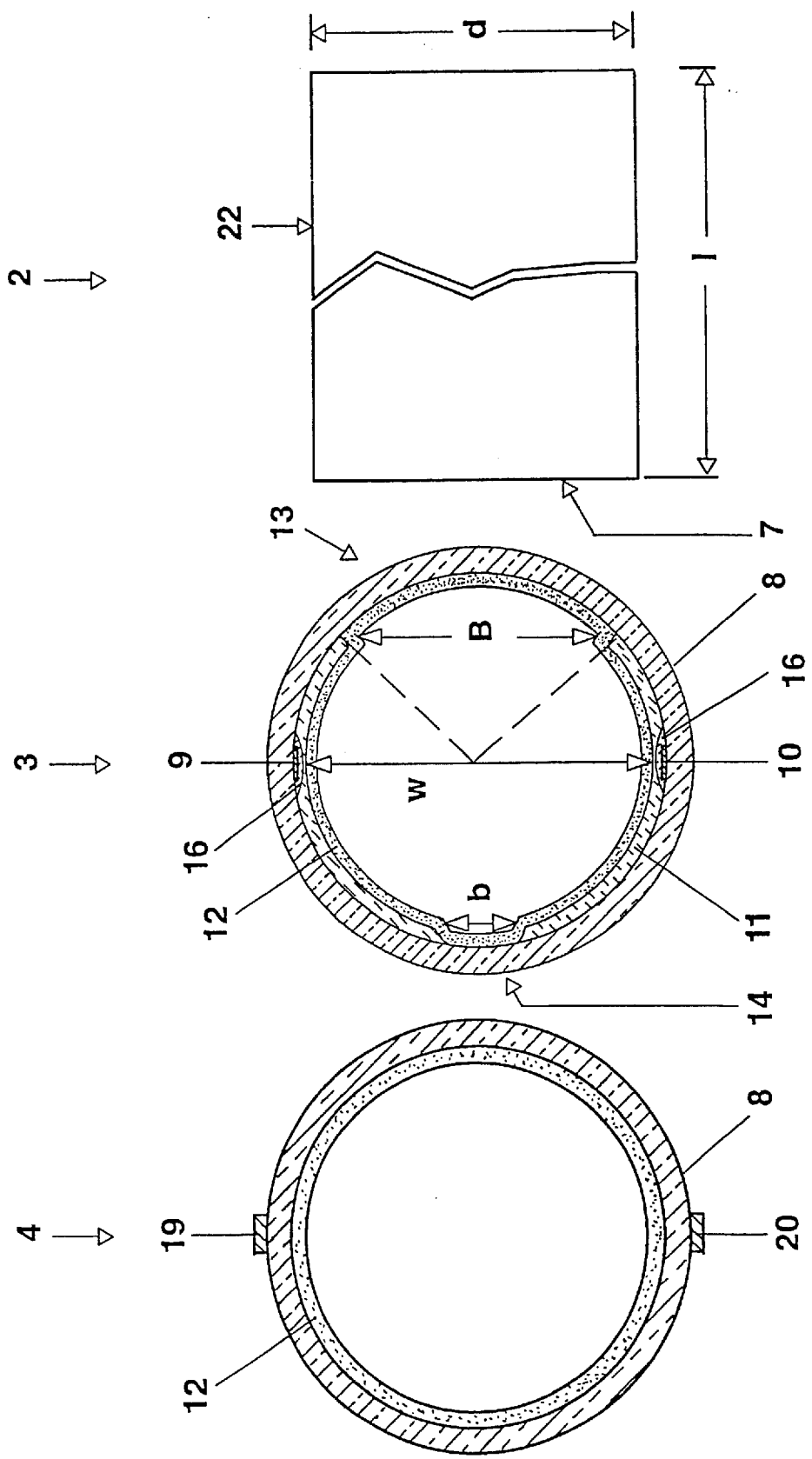
FIG. 1b shows a sectional illustration of the flat lighting device from FIG. 1a, and FIG. 2 shows a variant of a flat lighting device.

The optical conductor plate 2 comprises a flat Plexiglas cuboid of thickness d=10 mm, length L=27 cm and width l=20 cm. A first 7 of the four narrow sides of the optical conductor plate 2 is denoted below for the sake of simplicity as "light entrance edge".

The double-aperture fluorescent lamp 3 is arranged directly parallel to the light entrance edge 7 of the optical conductor plate 2. The lamp 3 comprises a tubular discharge vessel 8, two electrodes 9, 10 and a functional layer system. The layer system comprises a reflective layer 11 made from $TiO_2$, and a fluorescent layer 12 made from a three-band fluorescent material. The three-band fluorescent material comprises a mixture of the blue component $BaMgAl_{10}O_{17}$:Eu, the green component $LaPO_4$:Ce, Tb and the red component $(Y, Gd)BO_3$:Eu. The resulting colour coordinates are x=0.395 and y=0.383, that is to say white light is generated. The reflective layer 11 is applied directly to the inner wall of the discharge vessel 8, a first aperture 13 of width B=8 mm, and a second aperture 14 of width b=1 mm being cut out. The dimensioning of the respective widths B, b of the two apertures 13, 14 ensures an efficient use of the light, generated by the double-aperture fluorescent lamp 3, for normal operation, on the one hand, and a clear reduction of the light generated by the second fluorescent lamp 4, on the other hand. For this purpose, the first aperture 13 faces the optical conductor plate 2, and the second aperture 14 faces the second fluorescent lamp 4, which is arranged downstream of the double-aperture fluorescent lamp 3. The fluorescent layer 12 is applied to the reflective layer 11 or, in the region of the apertures 13, 14, directly to the inner wall of the discharge vessel 8. The outside diameter of the discharge vessel 8 consisting of glass is approximately 14 mm in conjunction with a wall thickness of approximately 0.5 mm. The length of the tubular discharge vessel 8, which is sealed in a gastight fashion at both its ends with the aid of a dome (15, or not illustrated) formed from the material of the vessel, is approximately 27 cm. Xenon with a filling pressure of approximately 17 kPa is located inside the discharge vessel 8. The two electrodes 9, 10 are constructed as metal strips which are arranged on the inner wall of the discharge vessel 8 in a fashion. parallel to the longitudinal axis of the tube and diametrically relative to one another. Use is made in this way of the maximum possible arcing distance W for the discharge in the case of a tubular discharge vessel, and a correspondingly high light flux of the lamp is consequently achieved (explanations of this are to be found in WO-A-94/23442). Both electrodes 9, 10 are covered with a dielectric layer 16 made from glass solder. The lamp is provided with a cap 17 at one end. The cap 17 has two connecting pins 18a, 18b which are connected to the two electrodes 9, 10.

The fluorescent lamp 4 is arranged—with reference to the optical conductor plate 2—downstream of the double-aperture fluorescent lamp 3. Identical features are provided with identical reference numerals By contrast with the double-aperture fluorescent lamp 3, the two elongated electrodes 19, 20 are fitted here on the outer wall of the discharge vessel 8. Moreover, the fluorescent lamp 4 has no reflective layer and no aperture.

The two EBs are connected via supply leads 21a, 21b to the corresponding connecting pins 18a, 18b of the two lamps 3, 4, and permit the mutually independent operation with the aid of active power pulses separated from one another by pauses, in accordance with the already cited WO-A-94/23442. A circuit arrangement suitable for this purpose is to be found, for example in EP-A-0 781 078.

In normal operation, only the double-aperture fluorescent lamp 3 is operated by means of the connected first EB 5. The result is a relatively high luminance on the front side 22 of the optical conductor plate 2.

In dimmed operation, the double-aperture fluorescent lamp 3 is switched off, and the second fluorescent lamp 4, arranged downstream thereof, is switched on by means of the EB 6. As a result, the double-aperture fluorescent lamp 3 acts as a diffuser for the light being coupled into the optical conductor plate 2 from the fluorescent lamp 4. Consequently, the luminance on the front side 22 of the optical conductor plate 2 is clearly lower than in normal operation.

Figure 2:
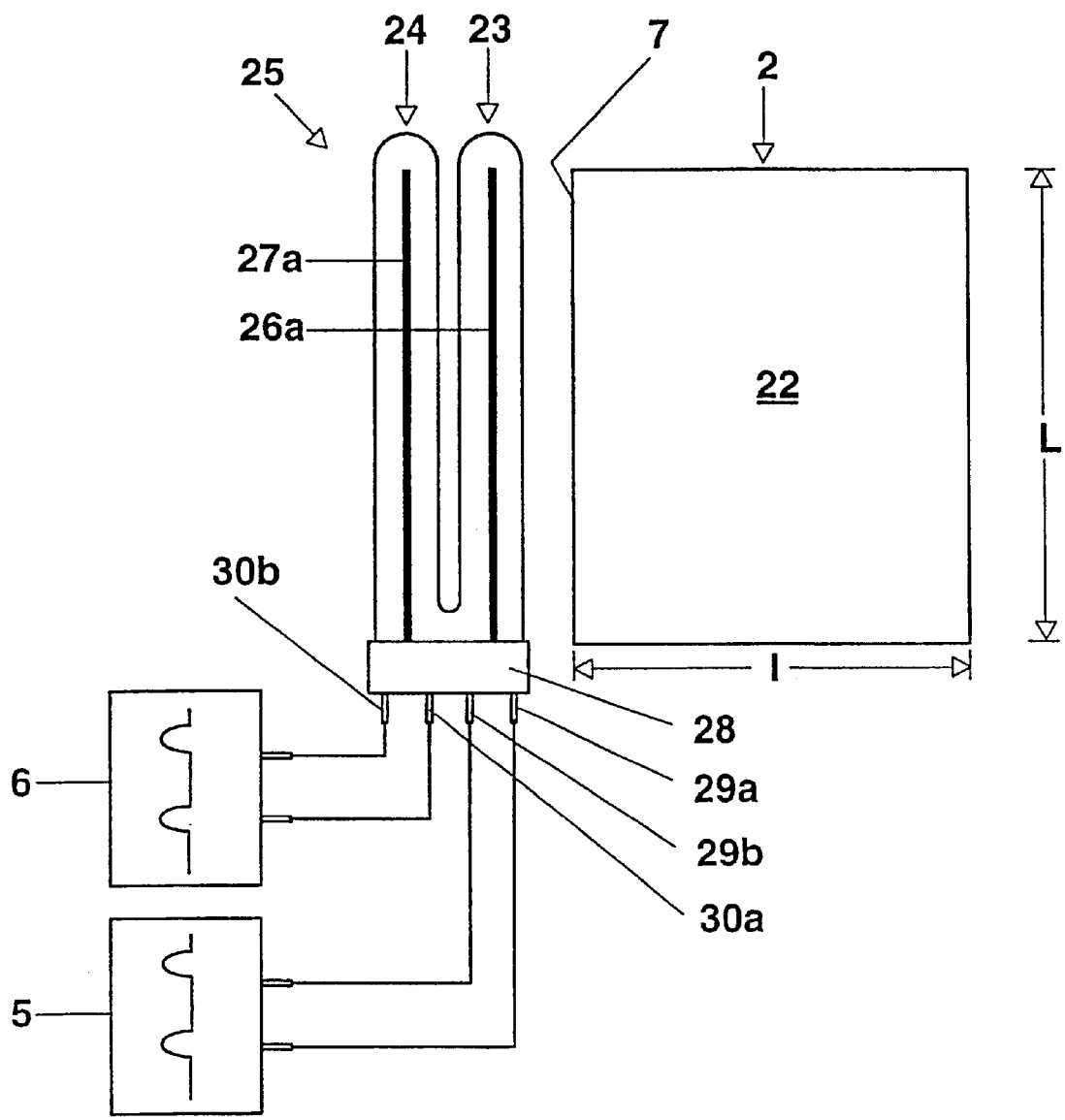

FIG. 2 shows a variant of the flat lighting device from FIG. 1a. Identical features are provided with identical reference numerals. By contrast with the device in FIG. 1a, the double-aperture fluorescent lamp 3 and the fluorescent lamp 4 are implemented here by the two limbs 23 and 24, respectively, of a single U-shaped fluorescent lamp 25. Two linear electrodes 26a (26b not visible) and 27a (27b not visible), respectively, are arranged diametrically in pairs on the outer wall of the two limbs 23, 24 and parallel to their longitudinal axes. At its end, the fluorescent lamp 25 has a cap 28 which is provided with four connecting pins 29a,b and 30a,b for the respective electrodes 26a, 26b or 27a, 27b. The first light source, formed by means of the first limb 23, is fed by the first EB 5, and the second light source, formed by means of the second limb 24, is fed by the second EB 6. The mode of operation of this variant corresponds to that described with reference to FIGS. 1a,b.

Of course, the teaching proposed can be applied to more than one "light entrance edge" of the optical conductor plate, without the advantageous action of the invention being lost. Rather, it is even possible with the aid of light injections via two, three or even four "light entrance edges" to implement a more finely stepped dimming, although with a corresponding extra outlay on lamps. Likewise, the individual lamps can be bent, for example in the shape of an L or U, such that they run along more than one, specifically two or three "edges". All these variants are also explicitly claimed.

What is claimed is:

1. Flat lighting device (1) having an optical conductor plate (2) and at least two electric light sources (3, 4; 23, 24) which are suitable for coupling light into the optical conductor plate (2) during operation; characterized in that a first (3;23) of the at least two light sources is arranged adjacent to the optical conductor plate (2), and in that a second (4;24) of the at least two light sources is arranged downstream of the first light source (3;23) with reference to the optical conductor plate (2) in such a way that at least a portion of the light emitted by the second light source (4;24) during operation can pass through the first light source (3;23),into the optical conductor plate (2), the first light source (3;23) reducing the light flux to be coupled into the optical conductor plate (2) from the second light source (4;24), the first light source having a first aperture (13) through which light can pass to the optical conductor plate (2).

2. Lighting device according to claim 1, in which the two light sources are implemented by two tubular fluorescent lamps (3;4) which are oriented parallel to one another.

3. Lighting device according to claim 1, in which the two light sources are implemented by a U-shaped fluorescent lamp (25), and in which the two limbs (23, 24) of the fluorescent lamp (25) are provided with electrodes (26a,b; 27a,b) which can be switched independently in each case.

4. Lighting device according to claim 2, in which the fluorescent lamps contain an inert gas.

5. Lighting device according to claim 2, in which the fluorescent lamps (3) each comprise at least one dielectrically impeded electrode (9;19;19;20;26a,b;27a,b).

6. Lighting device according to claim 1, in which the first light source (3) has a second aperture (14), which faces the second light source (4) and can therefore act as a stop for the light to be coupled into the first light source (3) from the second light source (4).

7. Lighting device according to claim 6, in which the second aperture (14) is narrower than the first aperture (13).

8. Lighting device according to claim 6, in which the wall of the first light source (3), with the exception of the aperture(s) (13, 14) is provided with a reflective layer (11).

\* \* \* \* \*